(12) United States Patent
Chang et al.

(10) Patent No.: US 10,733,410 B2
(45) Date of Patent: Aug. 4, 2020

(54) OPTICAL OPERATION MODULE WITH FINGERPRINT IDENTIFICATION DEVICE AND OPERATING METHOD THEREOF

(71) Applicant: ABILITY OPTO-ELECTRONICS TECHNOLOGY CO. LTD., Taichung (TW)

(72) Inventors: Yeong-Ming Chang, Taichung (TW); Po-Jui Liao, Taichung (TW); Chien-Hsun Lai, Taichung (TW); Yao-Wei Liu, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 148 days.

(21) Appl. No.: 16/128,778

(22) Filed: Sep. 12, 2018

(65) Prior Publication Data

US 2019/0294847 A1     Sep. 26, 2019

Related U.S. Application Data

(60) Provisional application No. 62/645,198, filed on Mar. 20, 2018.

(51) Int. Cl.
*G06K 9/00* (2006.01)
*F21V 8/00* (2006.01)

(52) U.S. Cl.
CPC ......... *G06K 9/0004* (2013.01); *G02B 6/0018* (2013.01); *G06K 9/00087* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,356,296 | B2* | 7/2019 | Wu | G02B 6/0018 |
| 10,410,037 | B2* | 9/2019 | He | G06K 9/00046 |
| 2017/0124375 | A1* | 5/2017 | Tseng | G06K 9/00013 |
| 2017/0351901 | A1* | 12/2017 | Kim | G06K 9/0002 |
| 2019/0294853 | A1* | 9/2019 | Mienko | G06K 9/0008 |

* cited by examiner

*Primary Examiner* — John B Strege
(74) *Attorney, Agent, or Firm* — Muncy, Geissler, Olds & Lowe, P.C.

(57) ABSTRACT

An optical operating module including a light-emitting element, a light guide element, a display panel, and a control element is provided. The light-emitting element includes a first light-exit surface, an electrical connector and a light-emitting unit. The light guide includes a first light-receiving surface, a reflective surface, a first reflective surface, and a second light-emitting surface. The display panel is partially disposed on the light guide, and the other part of the display panel not disposed on the light guide forms an accommodating space with the light guide element, and includes a second light-receiving surface and a third light-exit surface. The control element is disposed in the accommodating space, and generates a control signal to control the light-emitting element after receiving a command of an action. The optical operating module provides abundant light and controls the controlled terminal after the fingerprint identification device recognizes fingerprints.

25 Claims, 14 Drawing Sheets

OPTICAL OPERATION MODULE WITH FINGERPRINT IDENTIFICATION DEVICE AND OPERATING METHOD THEREOF

CROSS-REFERENCE TO RELATED APPLICATION

This application claims priority to and the benefit of, pursuant to 35 U.S.C. § 119, U.S. provisional patent application Ser. No. 62/645,198 filed on Mar. 20, 2018, the disclosure of which is incorporated herein in its entirety by reference.

BACKGROUND OF THE INVENTION

1. Field of the Invention

The present invention relates to an optical operating module with a fingerprint identification device and an operating method thereof, particular referring to an optical operating module with a fingerprint identification device and an operating method thereof that provides abundant light and allows a user to operate other systems or devices.

2. Description of the Related Art

Fingerprint identification devices in general are only equipped with identification functions, making it difficult to realize the integration of functions such as operation and control into a module or a system. Therefore, the attempt to operate and control other modules or systems requires additional interfaces or operational devices, resulting in an increase in volume. Additionally, optical operating modules in general do not provide a function able to notify the user by emitting abundant light under different circumstances, so the integration of functions such as operation and control into a module or a system also becomes difficult. As a result, an optical operating module with fingerprint identification device and operating method thereof are required to solve the above-mentioned problems.

SUMMARY OF THE INVENTION

In view of the problems in prior art, the present invention provides an optical operating module with a fingerprint identification device and an operating method thereof, which is equipped with a function able to notify the user by emitting abundant light under different circumstances, and is able to integrate functions such as operation and control into a single module or system.

On the basis of the purpose stated above, the present invention provides an optical operating module including at least one light-emitting element, a light guide element, at least one display panel, and a control element. The at least one light-emitting element includes a first light-exit surface, an electrical connector, and at least one light-emitting unit. The electrical connector conducts and inputs a driving current into the light-emitting unit. The light-emitting unit provides a light to the first light-exit surface, and the light is emitted from the first light-exit surface. A light guide element includes at least one first light-receiving surface, at least one reflective curved surface, a first reflective surface, and at least one second light-exit surface. The first light-receiving surface forms a gap with the first light-exit surface, and receives the light from the first light-exit surface. The reflective curved surface receives and reflects the light from the first light-receiving surface, and a bent angle of the reflective curved surface is in a range from 0 to 180 degrees. The reflective curved surface includes a curved surface formed with one or multiple of a straight line, a circular arc line, and a polynomial fitting curve. The first reflective surface receives and reflects the light from the reflective curved surface. The at least one second light-exit surface is disposed opposite to the first reflective surface, forms an angle with the first reflective surface, and receives the light from the first reflective surface with the light being emitted from the second light-exit surface. The at least one display panel is partially disposed on the light guide element, and the other part of the display panel not disposed on the light guide element forms an accommodating space with the light guide element. The display panel includes a second light-receiving surface and a third light-exit surface. The second light-receiving surface receives the light from the second light-exit surface. The third light-exit surface receives the light from the second light-receiving surface, and the light is emitted from the third light-exit surface. The control element is disposed in the accommodating space, and at least generates a control signal to control the light-emitting element after receiving a command of an action.

Preferably, the control element is electrically connected to an operation processing device, and the operation processing device receives the control signal to control an operation mode that performs the startup, shutdown, or switching of a controlled terminal.

Preferably, the controlled terminal includes at least one of a cell phone, a notebook, a vehicle activating device, a vehicle operating system, a door opening device, and a door lock.

Preferably, an accommodating slot is disposed on a center of a top surface of the light guide element, an outer edge of the top surface is the second light-exit surface, and the display panel is bonded to the second-exit surface by an optical adhesive and forms the accommodating space with the accommodating slot.

Preferably, the gap between the first light-receiving surface and the first light-exit surface is less than 1.0 mm, and an angle formed between the first light-receiving surface and the first light-exit surface is less than 90 degrees. The first reflective surface is disposed opposite to the second light-exit surface, and the angle formed between the first reflective surface and the second light-exit surface is less than 90 degrees.

Preferably, the light-emitting element includes at least one light-emitting diode unit, and the control element controls the light-emitting diode unit to generate visible light having a plurality of colors.

Preferably, the second light-receiving surface and the third light-exit surface include a printed specific pattern, the printed specific pattern includes a light-transmissive region and a light-impermeable region, and the visible light is emitted from the light-transmissive region.

Preferably, the light guide element is an optical plastic injection element, and the refractive index of the optical plastic injection element is between 1.4 and 1.7.

Preferably, the display panel is an optical plastic injection element, an optical glass element, or a sapphire glass element, the refractive index of the optical plastic injection element is between 1.4 and 1.7, and the refractive indices of the optical glass element and the sapphire glass element are between 1.4 and 2.0.

On the basis of the aforementioned purpose, the present invention further provides an optical operating module with a fingerprint recognition device including at least one light-emitting element, a light guide element, at least one display panel, and a fingerprint recognition device. The light-emitting element includes a first light-exit surface, an electrical connector, and at least one light-emitting unit. The electrical connector conducts and inputs a driving current into the light-emitting unit. The light-emitting unit provides at least a light to the first light-exit surface, and the light is emitted from the first light-exit surface. A light guide element includes at least one first light-receiving surface, at least one reflective curved surface, a first reflective surface, and at least one second light-exit surface. The first light-receiving surface forms a gap with the first light-exit surface, and receives the light from the first light-exit surface. The reflective curved surface receives and reflects the light from the first light-receiving surface, and a bent angle of the reflective curved surface is in a range from 0 to 180 degrees. The reflective curved surface includes a curved surface formed with one or multiple of a straight line, a circular arc line, and a polynomial fitting curve. The first reflective surface receives and reflects the light from the reflective curved surface. The second light-exit surface is disposed opposite to the first reflective surface, forms an angle with the first reflective surface, and receives the light from the first reflective surface with the light being emitted from the second light-exit surface. The display panel is partially disposed on the light guide element, and the other part of the display panel not disposed on the light guide element forms an accommodating space with the light guide element. The display panel includes a second light-receiving surface and a third light-exit surface. The second light-receiving surface receives the light from the second light-exit surface. The third light-exit surface receives the light from the second light-receiving surface, and the light is emitted from the third light-exit surface. The fingerprint recognition device is disposed in the accommodating space and connected to the panel display, including a substrate, a fingerprint recognition sensor, a micro-control unit (MCU). The fingerprint recognition sensor is disposed between the substrate and the third light-exit surface, receives a fingerprint, and generates a fingerprint recognition signal. The MCU recognizes an identity of a user after receiving the fingerprint recognition signal, and generates a control signal according to an identity recognition result from the user to control the light emitted from the light-emitting element.

Preferably, the MCU is electrically connected to a controlled terminal, and the MCU controls an operation mode that performs the startup, shutdown, or switching of the controlled terminal.

Preferably, the controlled terminal includes at least one of a cell phone, a notebook, a vehicle activating device, a vehicle operating system, a door open device, and a door lock.

Preferably, the light-emitting element includes at least one light-emitting diode unit, and the light-emitting diode unit generates visible light having a plurality of colors according to the control signal.

Preferably, the second light-receiving surface and the third light-exit surface include a printed specific pattern, the printed specific pattern includes a light-transmissive region and a light-impermeable region, and the visible light is emitted from the light-transmissive region.

Preferably, the light guide element is an optical plastic injection element, and the refractive index of the optical plastic injection element is between 1.4 and 1.7.

Preferably, an optical glass element, or a sapphire glass element, the refractive index of the optical plastic injection element is between 1.4 and 1.7, and the refractive indices of the optical glass element and the sapphire glass element are between 1.4 and 2.0.

Preferably, a portion of the display panel is bonded to the light guide element by an optical adhesive, a thickness of an optical adhesive layer formed by the optical adhesive is less than 0.02 mm, and a thickness of the display panel is less than or equal to 0.175 mm.

Preferably, an electric field distribution changes when the fingerprint of the user is pressed on the display panel. The fingerprint recognition sensor generates the fingerprint recognition signal according to the electric field distribution.

Preferably, a fingerprint image is generated on the display panel when the fingerprint of the user is pressed on the display panel, and the fingerprint recognition sensor generates the fingerprint recognition signal according to the fingerprint image.

On the basis of the aforementioned purpose, the present invention further provides an operating method of an optical operating module with a fingerprint recognition device, including following steps:

Generating the control signal by using the MCU of the optical operating module with the fingerprint recognition device to control the light emitted from the light-emitting element based on the identity of the user;

Generating a first light by using the light-emitting element when the identity recognition result matches;

Controlling the light-emitting element to generate a notifying operating light by the MCU when the identity recognition result matches;

Touching the display panel by the user when the MCU controls the light-emitting element to generate the notifying operating light;

Controlling an operation mode that performs the startup, shutdown, or switching of a controlled terminal by the MCU according to a frequency or contact time of touching the display panel by the user; and Generating a second light by using the light-emitting element when the identity recognition result does not match.

Preferably, when the identity recognition result does not match, the light-emitting element further generates a strong flashing light.

Preferably, the MCU is electrically connected to a sound notifying device.

Preferably, when the identity recognition result does not match, the MCU controls the sound notifying device to generate a notifying sound.

Preferably, when the controlled terminal receives a message, the MCU controls the light-emitting element to generate a message notifying light.

Preferably, the message includes a SMS notification, an incoming call notification, a power status indication, and an operation status indication.

DESCRIPTION OF THE PREFERRED EMBODIMENTS

Figure 1:
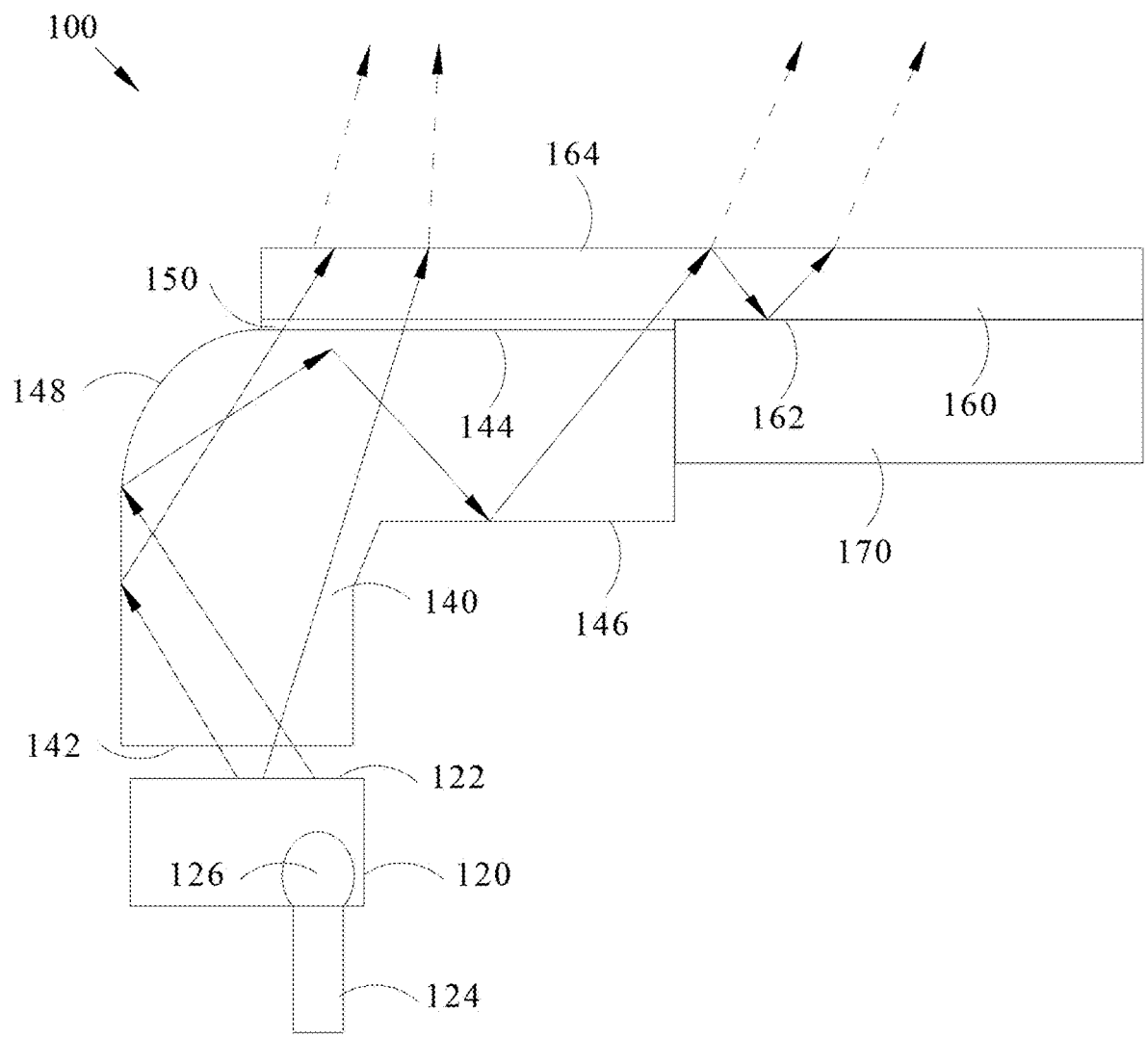
FIG. 1 is a first schematic diagram of the optical operating module according to an embodiment in the present invention.
Figure 2:
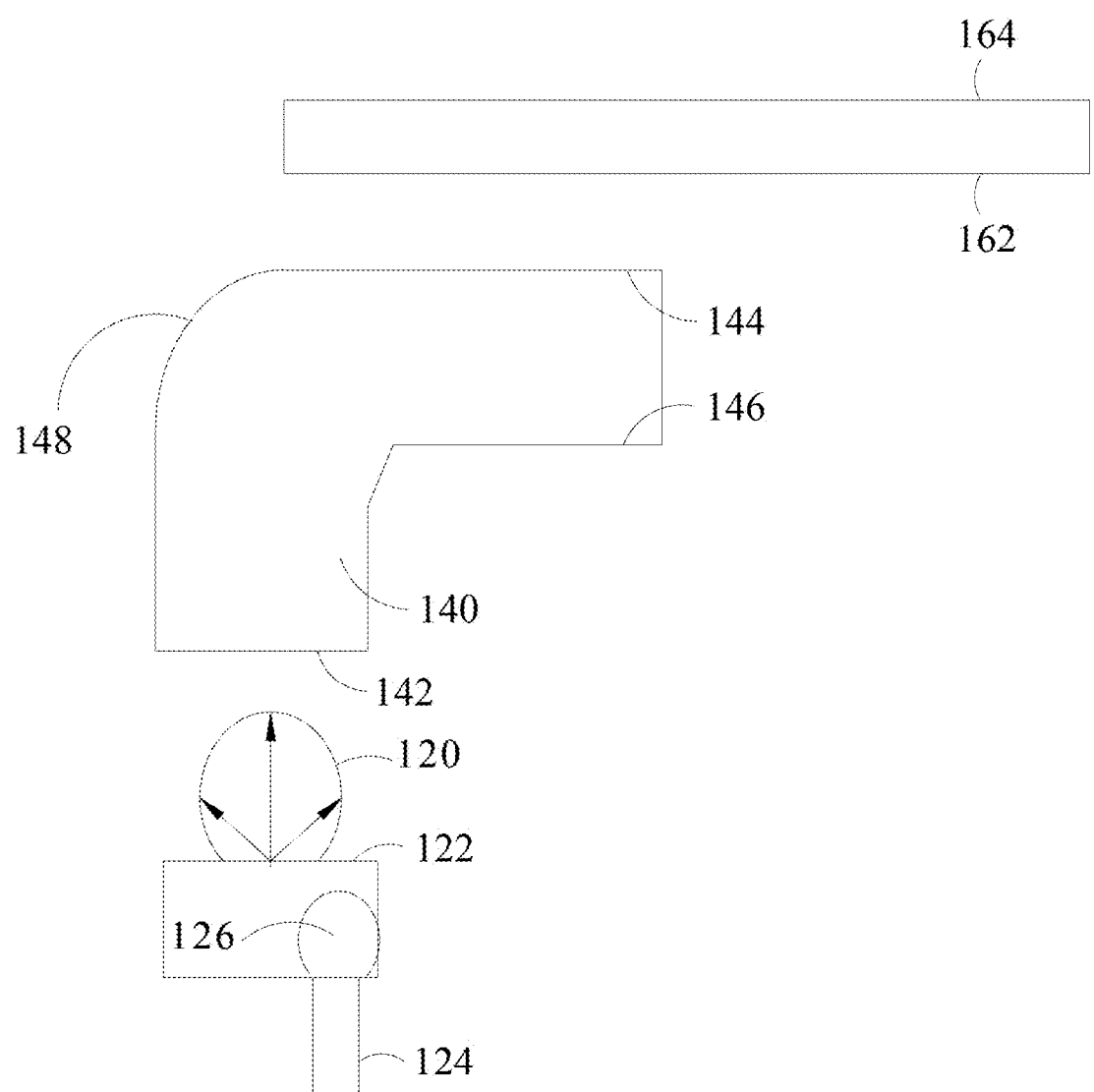
FIG. 2 is a second schematic diagram of the optical operating module according to an embodiment in the present invention.

To facilitate the review of the technique characteristics, contents, advantages, and achievable effects of the present invention, the embodiments together with the drawings are described in detail as follows. However, the drawings are used only for the purpose of indicating and supporting the specification, which is not necessarily the real proportion and precise configuration after the implementation of the present invention. Therefore, the relations of the proportion and configuration of the attached drawings should not be interpreted to limit the actual scope of implementation of the present invention.

Embodiments of the optical operating module with fingerprint identification device and operating method thereof in the present invention are explained together with corresponded drawings. For ease of understanding, the same elements in the following embodiments are illustrated in the same symbols.

Please refer to FIGS. 1 to 5, respectively referring to the first to the fifth schematic diagrams of the optical operating module according to an embodiment in the present invention.

The optical operating module 100 in the present invention includes at least one light-emitting element 120, a light guide element 140, at least one display panel 160, and a control element 170. The optical operating module 100 in the present invention emits abundant lights for various applications.

Specifically, the light-emitting element 120 includes a first light-exit surface 122, an electrical connector 124, and at least one light-emitting unit 126. The electrical connector 124 conducts and inputs a driving current into the light-emitting unit 126. The light-emitting unit 126 provides at least a light to the first light-exit surface 122, and the light is emitted from the first light-exit surface 122. In an embodiment, the light-emitting element 120 includes Lambertian sources, which indicates that the light-emitting intensity of the light-emitting element 120 accords with the law of cosines, $I(\theta)=I0*\cos\theta$, in distribution in space, where $\theta$ is an angle of a plane normal vector with the light-emitting element 120; I0 is the light-emitting intensity when the angle of the plane normal vector with the light-emitting element 120 is 0 degrees; $I(\theta)$ is the light-emitting intensity when the angle of the plane normal vector with the light-emitting element 120 is $\theta$ degrees. In another embodiment, the light-emitting element 120 includes at least one light-emitting diode unit. Therefore, the at least one light-emitting diode unit can be the light-emitting unit 126, and the control element 170 controls the at least one light-emitting diode unit to generate visible light having a plurality of colors. Therefore, the optical operating module 100 is able to emit abundant lights for various applications.

The light guide element 140 includes at least one first light-receiving surface 142, at least one reflective curved surface 148, a first reflective surface 146, and at least one second light-exit surface 144 to emit a light from the light-emitting element 120 to other elements, such as a fingerprint recognition element, an optical sensor lock, etc. In an embodiment, the light guide element 140 is an optical plastic injection element, and the refractive index of the optical plastic injection element is between 1.4 and 1.7.

Specifically, the first light-receiving surface 142 forms a gap with the first light-exit surface 122 and receives the light from the first light-exit surface 122. The reflective curved surface 148 receives and reflects the light from the first light-receiving surface 142.

In an embodiment, the gap between the first light-receiving surface 142 and the first light-exit surface 122 is less than 1.0 mm, and an angle formed between the first light-receiving surface 142 and the first light-exit surface 122 is less than 90 degrees, or 0 degrees which makes the two surfaces perfectly attach together. In another embodiment, a bent angle of the reflective curved surface 148 is in a range from 0 to 180 degrees. The reflective curved surface includes a curved surface formed with one or multiple of a straight line, a circular arc line, and a polynomial fitting curve. Different configurations can be made according to direction in which the light is directed.

Figure 3:
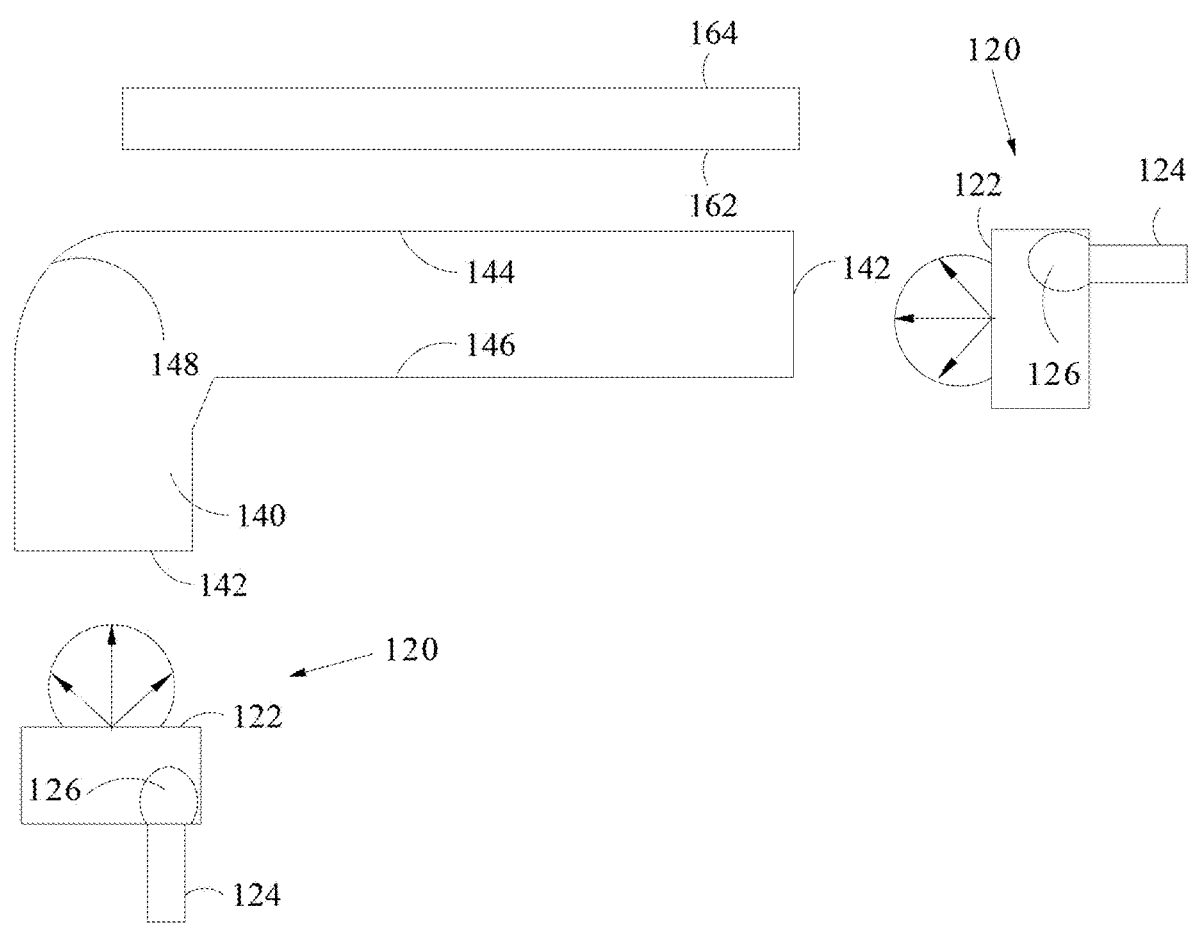
FIG. 3 is a third schematic diagram of the optical operating module according to an embodiment in the present invention.
Figure 4:
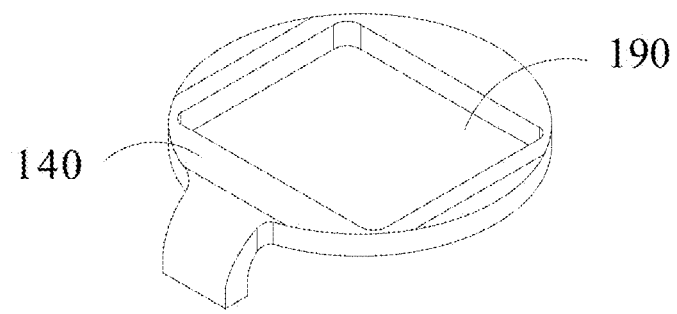
FIG. 4 is a forth schematic diagram of the optical operating module according to an embodiment in the present invention.
Figure 5:
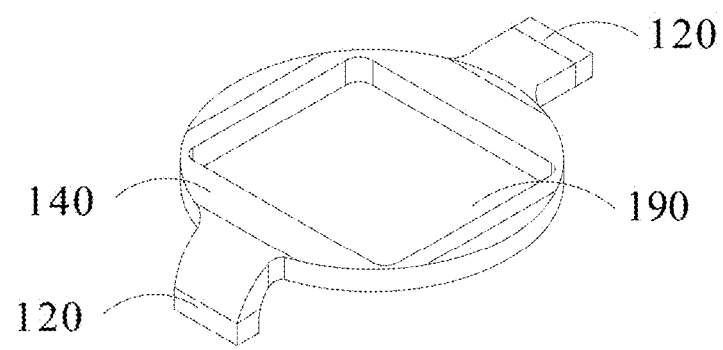
FIG. 5 is a fifth schematic diagram of the optical operating module according to an embodiment in the present invention.

In addition, in an embodiment, the present invention includes at least one light-emitting element 120 and at least one first light-receiving surface 142, so it is applicable to realize the configuration of the plurality of light-emitting elements 120 and the plurality of first light-receiving surfaces 142 shown in FIG. 3 and FIG. 5, for example, increasing the brightness of the second light-exit surface 144.

Figure 6:
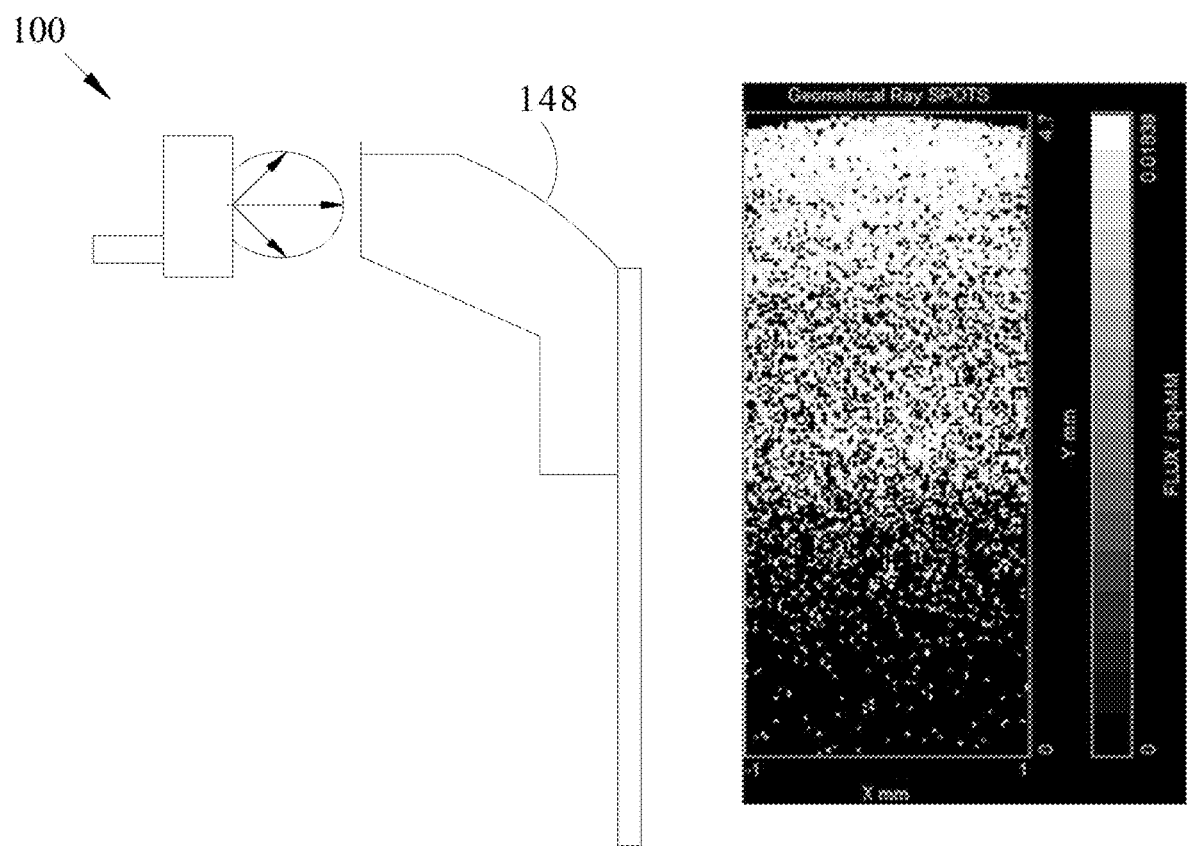
FIG. 6 is a first schematic diagram of the light guide element according to an embodiment in the present invention.
Figure 7:
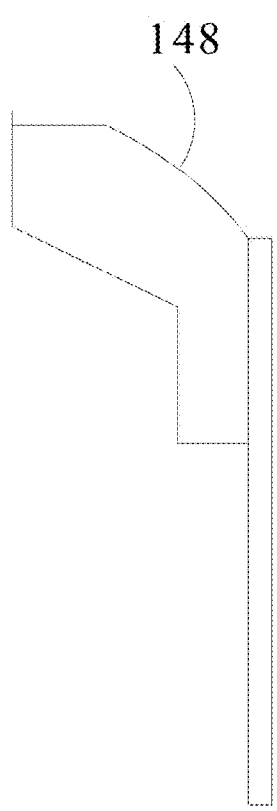
FIG. 7 is a second schematic diagram of the light guide element according to an embodiment in the present invention.
Figure 7:
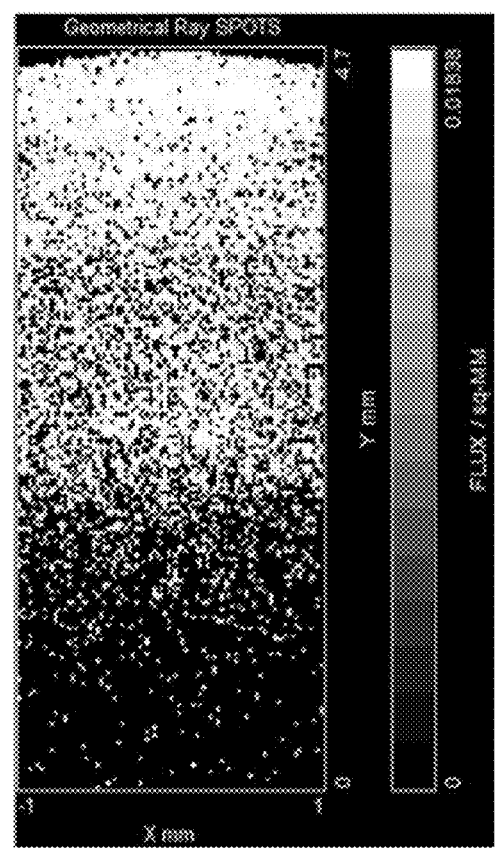
Figure 8:
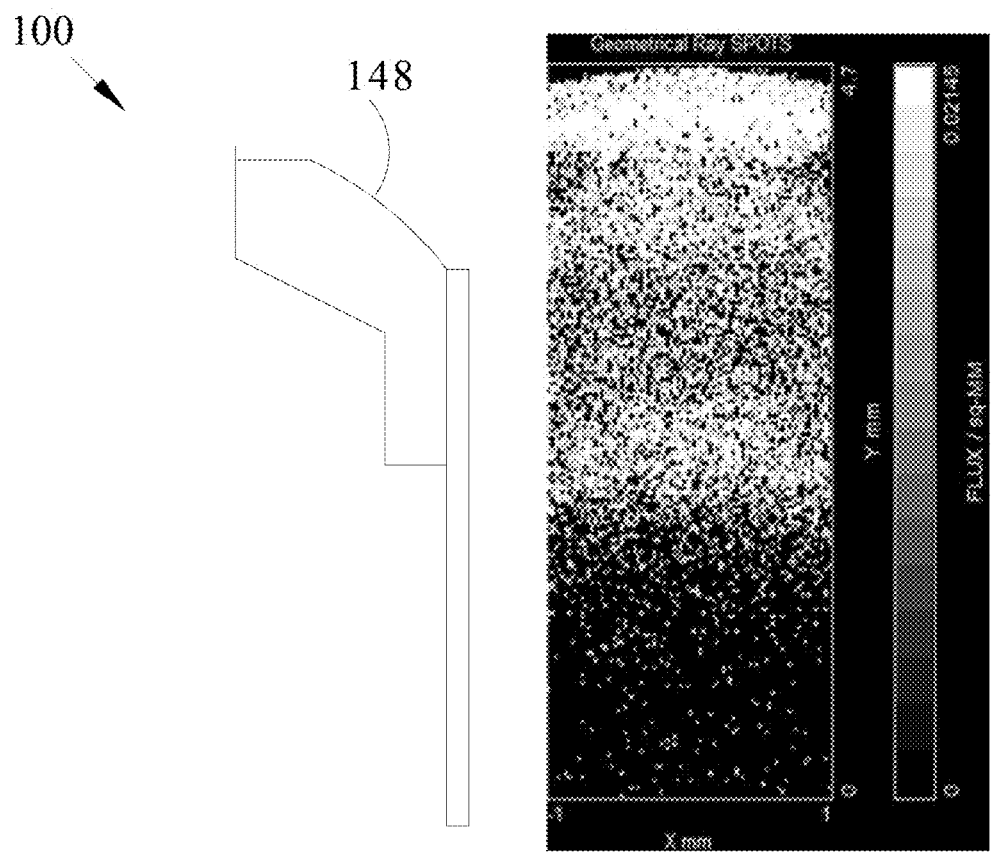
FIG. 8 is a third schematic diagram of the light guide element according to an embodiment in the present invention.

Specifically, please refer to FIGS. 6 to 8, illustrating the first to the third schematic diagrams of the light guide element according to embodiments in the present invention. In an embodiment as in FIGS. 6 to 8, the reflective curved surface 148 can be a polynomial fitting curve, and the light energy distribution is shown on the right side of FIGS. 6 to 8. In an embodiment as in FIG. 7, the reflective curved surface 148 can be a circular arc line, such as a circular arc formed by N points, and the light energy distribution is shown in FIG. 7.

The first reflective surface 146 receives and reflects the light from the reflective curved surface 148. The second light-exit surface 144 is disposed opposite to the first reflective surface 146, forms an angle with the first reflective surface 146, and receives the light from the first reflective surface 146 with the light being emitted from the second light-exit surface 144. In an embodiment, the first reflective surface 146 is disposed opposite to the second light-exit surface 144, and the angle formed between the first reflective surface 146 and the second light-exit surface 144 is less than 90 degrees.

Specifically, if the refractive index of the light guide element 140 is Nl, and the refractive index of the air is Na, the light passing through the first light-receiving surface 142 and entering the light guide element 140 can be transmitted under the condition that Nl is larger than Na. With the light advancing and entering the boundary surface of the light guide element 140, such as the first light-receiving surface 142, if the incident angle θi is larger than the total reflection angle θr, the light is totally reflected and continues to transmit inside the light guide element 140. If the incident angle θi is smaller than θr, a part of the light is reflected, and the other part is refracted. At the moment, the reflected light continues to be transmitted inside the light guide element 140, and the refracted light exits the boundary surface, such as the second light-exit surface 144, where the light is emitted into the second light-receiving surface 162.

The display panel 160 is partially disposed on the light guide element 140, and the display panel 160 includes the second light-receiving surface 162 and the third light-exit surface 164. Specifically, the second light-receiving surface 162 receives the light from the second light-exit surface 144. The third light-exit surface 164 receives the light from the second light-receiving surface 162, and the light is emitted from the third light-exit surface 164. In an embodiment, the second light-receiving surface 162 and the third light-exit surface 164 include a printed specific pattern, and the printed specific pattern includes a light-transmissive region and a light-impermeable region. The printed specific pattern is a letter pattern, such as an English letter, or a specific pattern, such as a circle or a square. The visible light is emitted from the light-transmissive region.

In an embodiment, the other part of the display panel 160 not disposed on the light guide element 140 forms an accommodating space with the light guide element 140, such as a fingerprint recognition element, an optical sensor lock, etc. In an embodiment, the display panel 160 can be an optical plastic injection element, an optical glass element, or a sapphire glass element. If it is an optical plastic injection element, the refractive index of the optical plastic injection element is between 1.4 and 1.7; if it is an optical glass element or a sapphire glass element, the refractive indices are between 1.4 and 2.0. In an embodiment, the display panel 160 has a predetermined thickness, and the predetermined thickness allows the light and the electric charge to transmit effectively, which can be 0.175 mm, or less than 0.195 mm.

Figure 9:
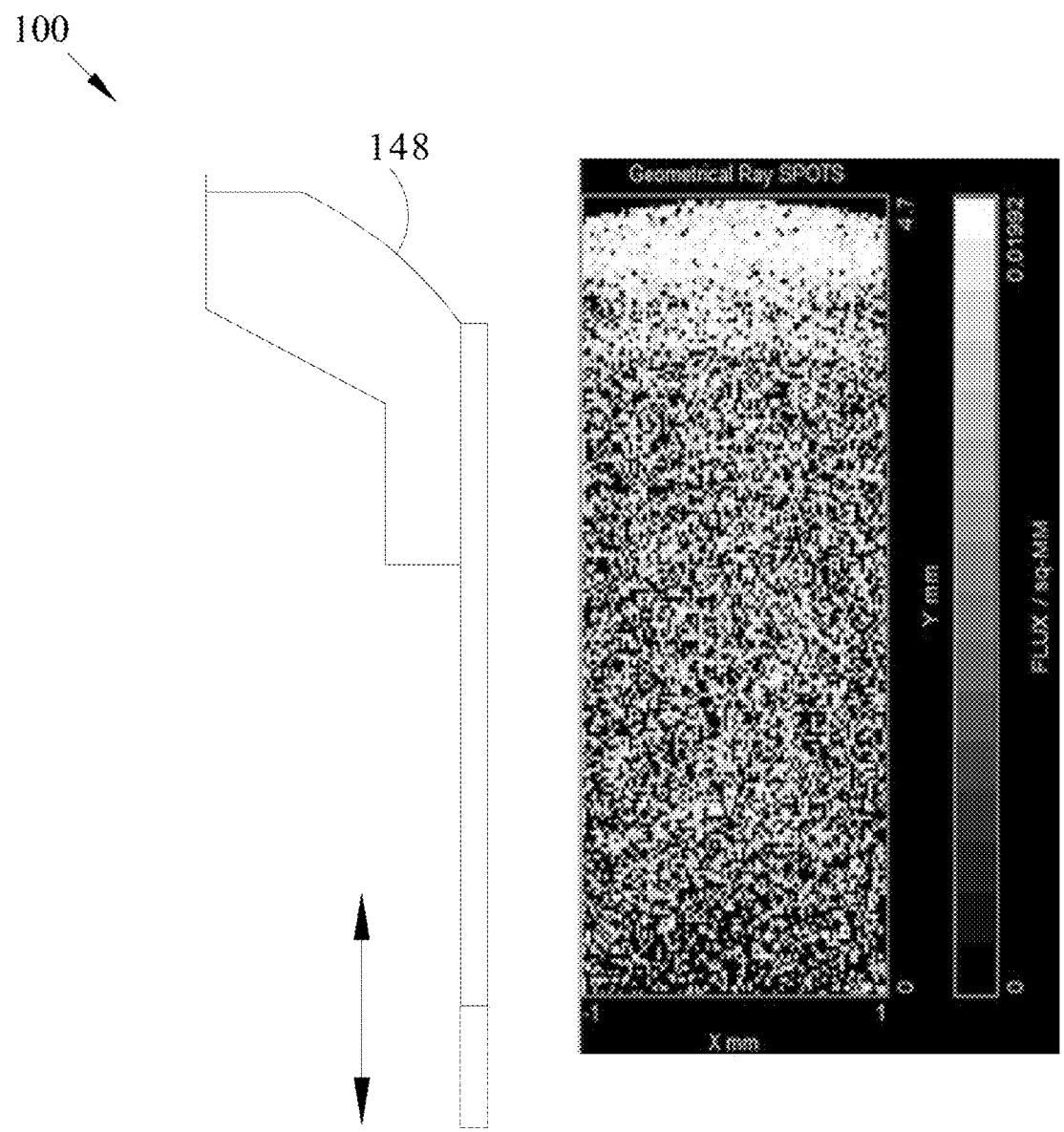
FIG. 9 is a forth schematic diagram of the light guide element according to an embodiment in the present invention.
Figure 10:
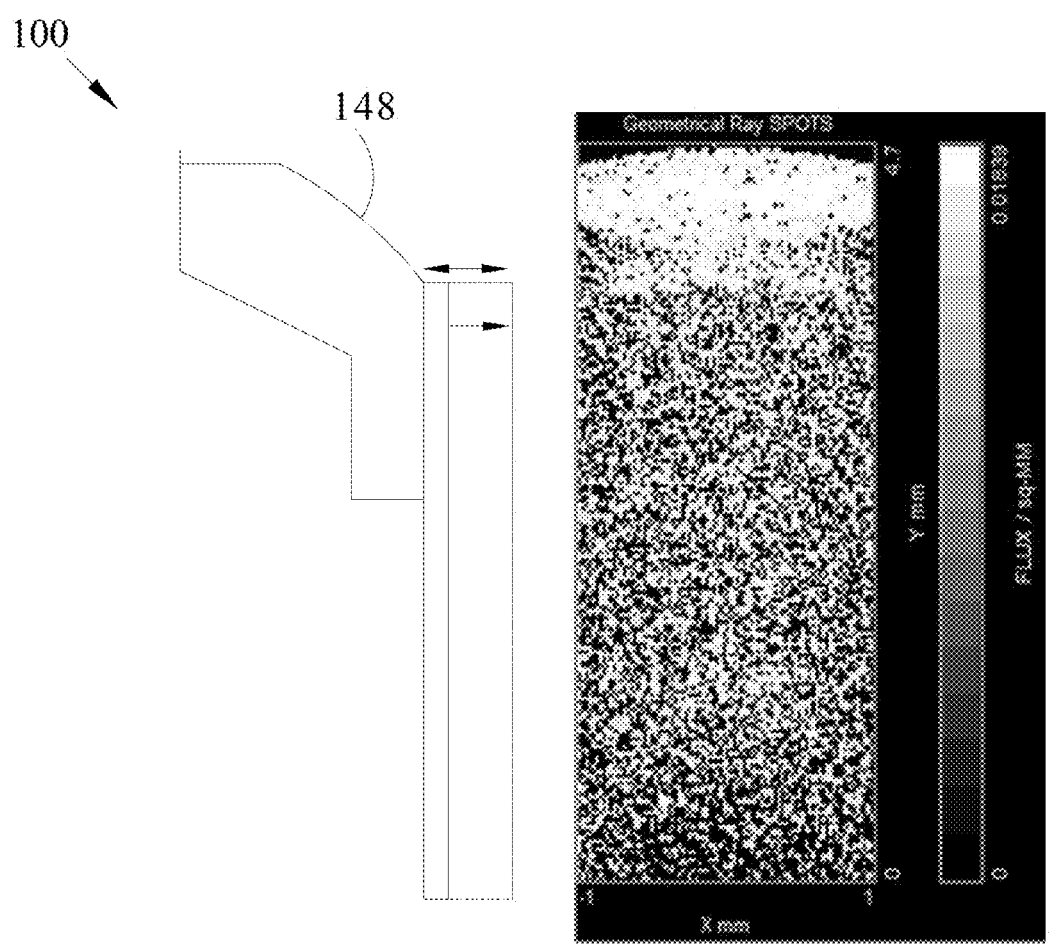
FIG. 10 is a fifth schematic diagram of the light guide element according to an embodiment in the present invention.

Specifically, please refer to FIGS. 9 and 10, illustrating the forth to the fifth schematic diagrams of the light guide element according to embodiments in the present invention. In an embodiment as in FIG. 9, the length of light guide element 140 on the display panel that is protruded 160 can be changed, for instance, increasing the length by 1.6 mm. The light energy distribution is shown on the right side of FIG. 9. In an embodiment as in FIG. 10, the thickness of the display panel 160 can be changed, for instance, making the thickness 0.7 mm. The light energy distribution is shown on the right side of FIG. 10.

The control element 170 is disposed on the accommodating space, and at least generates a control signal to control the light-emitting element 120 after receiving a command of an action. In addition, in an embodiment, the control element 170 is electrically connected to an operation processing device 200, and the operation processing device 200 receives the control signal to control an operation mode that performs the startup, shutdown, or switching of a controlled terminal.

In an embodiment, the controlled terminal includes at least one of a cell phone, a notebook, a vehicle activating device, a vehicle operating system, a door open device, and a door lock. Therefore, the optical operating module 100 in the present invention can at least be applied to startup or shutdown of the cell phone, notebook, vehicle, and/or door.

In an embodiment, the accommodating slot 190 is disposed on a center of a top surface of the light guide element 140, an outer edge of the top surface is the second light-exit surface 144, and the display panel 160 is bonded to the second-exit surface 144 by an optical adhesive and forms the accommodating space with the accommodating slot 190. Therefore, optical elements such as a fingerprint recognition element or an optical sensor lock can be disposed in the accommodating slot 190. In an embodiment, a thickness of an optical adhesive layer formed by the optical adhesive is less than 0.02 mm.

Figure 11:
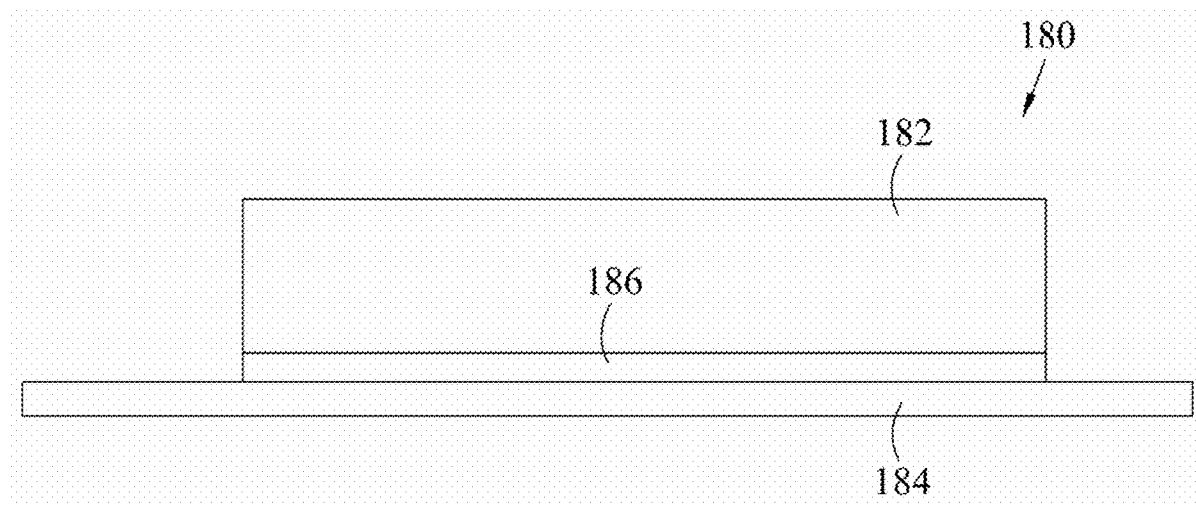
FIG. 11 is a schematic diagram of the optical operating module with a fingerprint recognition device according to an embodiment in the present invention.
Figure 12:
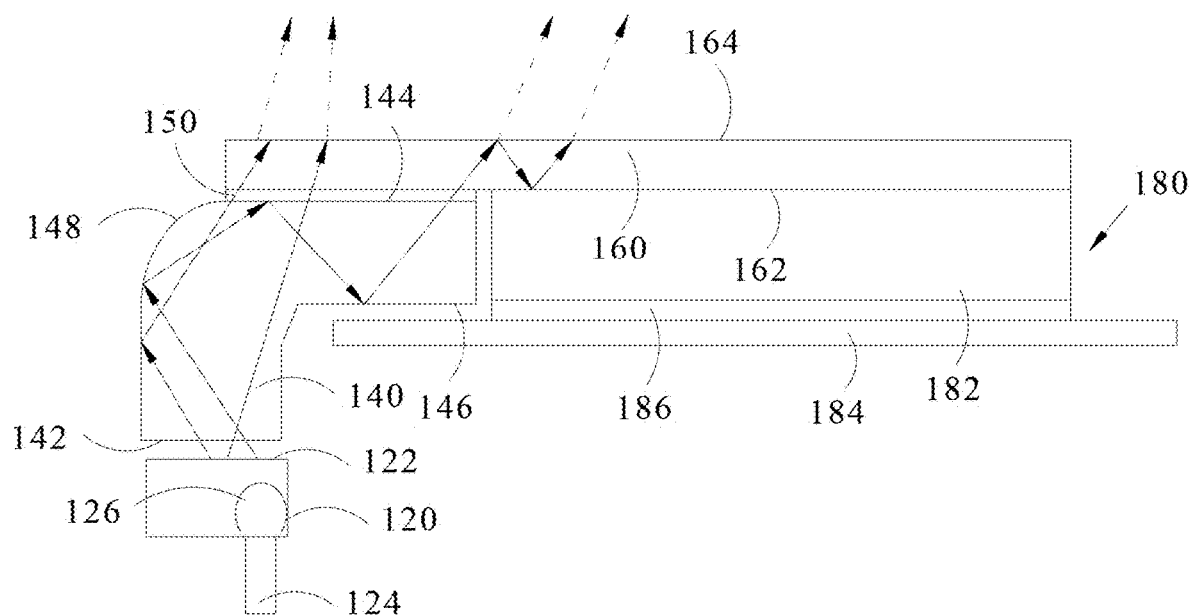
FIG. 12 is a first schematic diagram of the optical operating module with a fingerprint recognition device according to an embodiment in the present invention.
Figure 13:
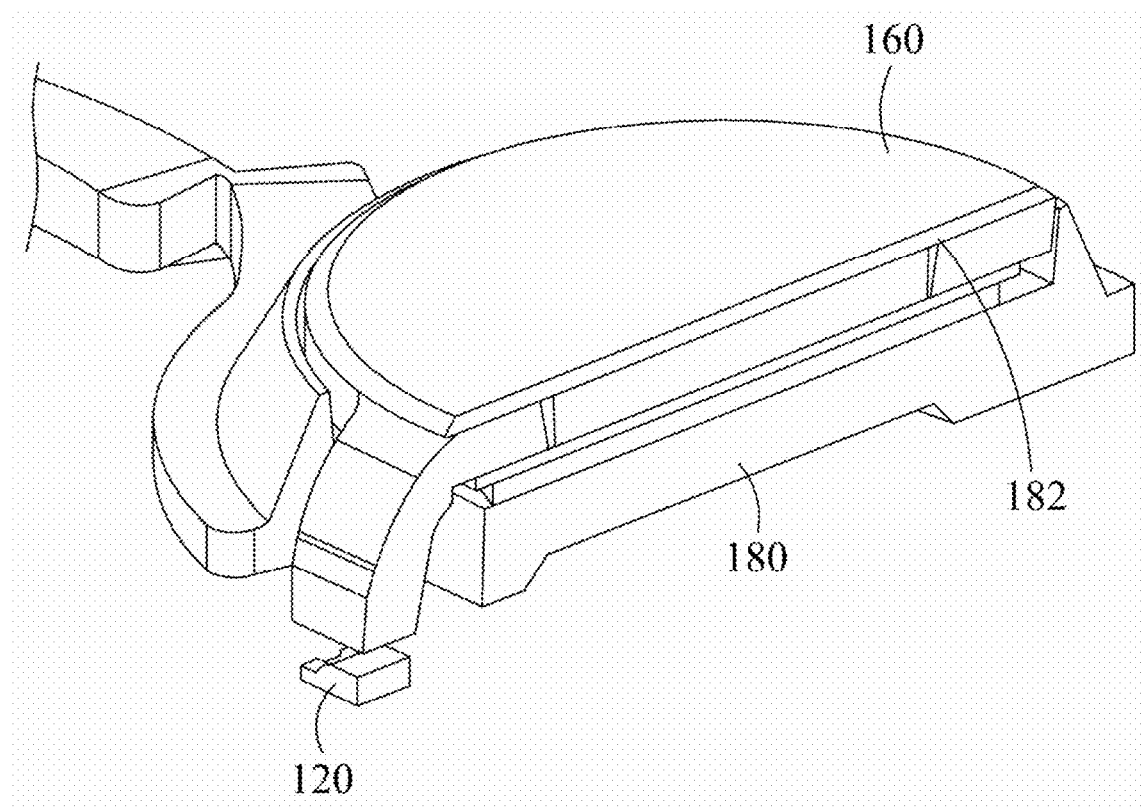
FIG. 13 is a second schematic diagram of the optical operating module with a fingerprint recognition device according to an embodiment in the present invention.

Please refer to FIGS. 1 to 5 and FIGS. 11 to 13. FIGS. 11 to 13 respectively are the third schematic diagram of the optical operating module according to an embodiment in the present invention, the schematic diagram of the optical operating module with a fingerprint recognition device, the first the schematic diagram, and the second schematic diagram. The present invention further provides an optical operating module 100 with a fingerprint recognition device, including at least one light-emitting element 120, a light guide element 140, at least one display panel 160, and a fingerprint recognition device 180.

Specifically, the light-emitting element 120 includes a first light-exit surface 122, an electrical connector 124, and at least one light-emitting unit 126. The electrical connector 124 conducts and inputs a driving current into the light-emitting unit 126. The light-emitting unit 126 provides at least a light to the first light-exit surface 122, and the light is emitted from the first light-exit surface 122. In an embodiment, the light-emitting element 120 includes Lambertian sources, which indicates that the light-emitting intensity of the light-emitting element 120 accords with the law of cosines, $I(\theta)=I0*\cos\theta$, in distribution in space, where θ is an angle of a plane normal vector with the light-emitting element 120; I0 is the light-emitting intensity when the angle of the plane normal vector with the light-emitting element 120 is 0 degrees; I(θ) is the light-emitting intensity when the angle of the plane normal vector with the light-emitting element 120 is θ degrees.

In another embodiment, the light-emitting element 120 includes at least one light-emitting diode unit. Therefore, the at least one light-emitting diode unit can be the light-emitting unit 126, and the control element 170 controls the at least one light-emitting diode unit to generate visible light having a plurality of colors. Therefore, the optical operating module 100 is able to emit abundant lights for various applications.

The light guide element 140 includes at least one first light-receiving surface 142, at least one reflective curved surface 148, a first reflective surface 146, and at least one second light-exit surface 144 to emit a light from the light-emitting element 120 to other elements, such as a fingerprint recognition element, an optical sensor lock, etc. In an embodiment, the light guide element 140 can be an optical plastic injection element, and the refractive index of the optical plastic injection element is between 1.4 and 1.7.

Specifically, the first light-receiving surface 142 forms a gap with the first light-exit surface 122, and receives the light from the first light-exit surface 122. The reflective curved surface 148 receives and reflects the light from the first light-receiving surface 142.

In an embodiment, the gap between the first light-receiving surface 142 and the first light-exit surface 122 is less than 1.0 mm, and an angle formed between the first light-receiving surface 142 and the first light-exit surface 122 is less than 90 degrees, or 0 degrees which makes the two surfaces perfectly attach together. In another embodiment, a bent angle of the reflective curved surface 148 is in a range from 0 to 180 degrees. The reflective curved surface includes a curved surface formed with one or multiple of a straight line, a circular arc line, and a polynomial fitting curve. Different configurations can be made according to direction in which the light is directed.

Specifically, please refer to FIGS. 6 to 8, illustrating the first to the third schematic diagrams of the light guide element according to embodiments in the present invention. In an embodiment as in FIGS. 6 to 8, the reflective curved surface 148 can be a polynomial fitting curve, and the light energy distribution is shown on the right side of FIGS. 6 to 8. In an embodiment as in FIG. 7, the reflective curved surface 148 can be a circular arc line, such as a circular arc formed by N points, and the light energy distribution is shown in FIG. 7.

The first reflective surface 146 receives and reflects the light from the reflective curved surface 148. The second light-exit surface 144 is disposed opposite to the first reflective surface 146, forms an angle with the first reflective surface 146, and receives the light from the first reflective surface 146 with the light being emitted from the second light exit surface 144. In an embodiment, the first reflective surface 146 is disposed opposite to the second light-exit surface 144, and the angle formed between the first reflective surface 146 and the second light-exit surface 144 is less than 90 degrees.

Specifically, if the refractive index of the light guide element 140 is Nl, and the refractive index of the air is Na, the light passing through the first light-receiving surface 142 and entering the light guide element 140 can be transmitted under the condition that Nl is larger than Na. With the light advancing and entering the boundary surface of the light guide element 140, such as the first light-receiving surface 142, if the incident angle θi is larger than the total reflection angle θr, the light is totally reflected and continues to transmit inside the light guide element 140. If the incident angle θi is smaller than θr, a part of the light is reflected, and the other part is refracted. At the moment, the reflected light continues to be transmitted inside the light guide element 140, and the refracted light exits the boundary surface, such as the second light-exit surface 144, where the light is emitted into the second light-receiving surface 162.

The display panel 160 is partially disposed on the light guide element 140, and the display panel 160 includes the second light-receiving surface 162 and the third light-exit surface 164.

Specifically, the second light-receiving surface 162 receives the light from the second light-exit surface 144. The third light-exit surface 164 receives the light from the second light-receiving surface 162, and the light is emitted from the third light-exit surface 164. In an embodiment, the second light-receiving surface 162 and the third light-exit surface 164 include a printed specific pattern, and the printed specific pattern includes a light-transmissive region and a light-impermeable region. The printed specific pattern is a letter pattern, such as an English letter, or a specific pattern, such as a circle or a square. The visible light is emitted from the light-transmissive region.

In an embodiment, the other part of the display panel 160 not disposed on the light guide element 140 forms an accommodating space with the light guide element 140, such as a fingerprint recognition element, an optical sensor lock, etc. In an embodiment, the display panel 160 can be an optical plastic injection element, an optical glass element, or a sapphire glass element. If it is an optical plastic injection element, the refractive index of the optical plastic injection element is between 1.4 and 1.7; if it is an optical glass element or a sapphire glass element, the refractive indices are between 1.4 and 2.0.

In an embodiment, the display panel 160 has a predetermined thickness, and the predetermined thickness allows the light and the electric charge to transmit effectively, which can be 0.175 mm, or less than 0.195 mm, so that the fingerprint recognition device 180 can successfully recognize fingerprints.

Specifically, please refer to FIG. 9 to FIG. 10, illustrating the forth to the fifth schematic diagrams of the light guide element according to embodiments in the present invention. In an embodiment as in FIG. 9, the length of the light guide element 140 on the display panel that is protruded 160 can be changed, for instance, increasing the length by 1.6 mm. The light energy distribution is shown on the right side of FIG. 7. In an embodiment as in FIG. 8, the thickness of the display panel 160 can be changed, for instance, making the thickness 0.7 mm. The light energy distribution is shown on the right side of FIG. 8.

The fingerprint recognition device 180 can be disposed in the accommodating space. It is preferable to dispose the device in the accommodating space formed by the accommodating slot 190 and the display panel 160, and to be connected to the panel display. The fingerprint recognition device 180 includes a substrate 184, a fingerprint recognition sensor 182, a micro-control unit (MCU) 186.

The fingerprint recognition sensor 182 can be disposed between the substrate 184 and the third light-exit surface 164, receive a fingerprint, and generate a fingerprint recognition signal. The MCU 186 recognizes an identity of a user after receiving the fingerprint recognition signal, and generates a control signal according to an identity recognition result from the user to control the light emitted from the light-emitting element 120.

Specifically, in an embodiment, in recognizing a fingerprint by a resistive or capacitive fingerprint recognition device 180, an electric field distribution on the display panel 160 changes when the fingerprint of the user is pressed on the display panel 160. The fingerprint recognition sensor 182 generates the fingerprint recognition signal according to the electric field distribution.

In another embodiment, in recognizing a fingerprint by an optical fingerprint recognition device 180, a fingerprint image is generated on the display panel 160 when the fingerprint of the user is pressed on the display panel 160, and the fingerprint recognition sensor 182 generates the fingerprint recognition signal according to the fingerprint image, such as a plurality of fingerprint features of the fingerprint image.

Specifically, in an embodiment, the MCU 186 can electrically be connected to the controlled terminal. The MCU 186 controls an operation mode that performs the startup, shutdown, or switching of a controlled terminal. In an embodiment, the controlled terminal includes at least one of a cell phone, a notebook, a vehicle activating device, a vehicle operating system, a door open device, and a door lock.

For instance, after recognizing the identity of the user, the mode can be set up as two slight taps by the user to startup the controlled terminal, as one long press to shut down the controlled terminal, and as one slight tap to switch the operation mode of the controlled terminal. Such example can be applied to some settings like switching a function menu of a cell phone.

Figure 14:
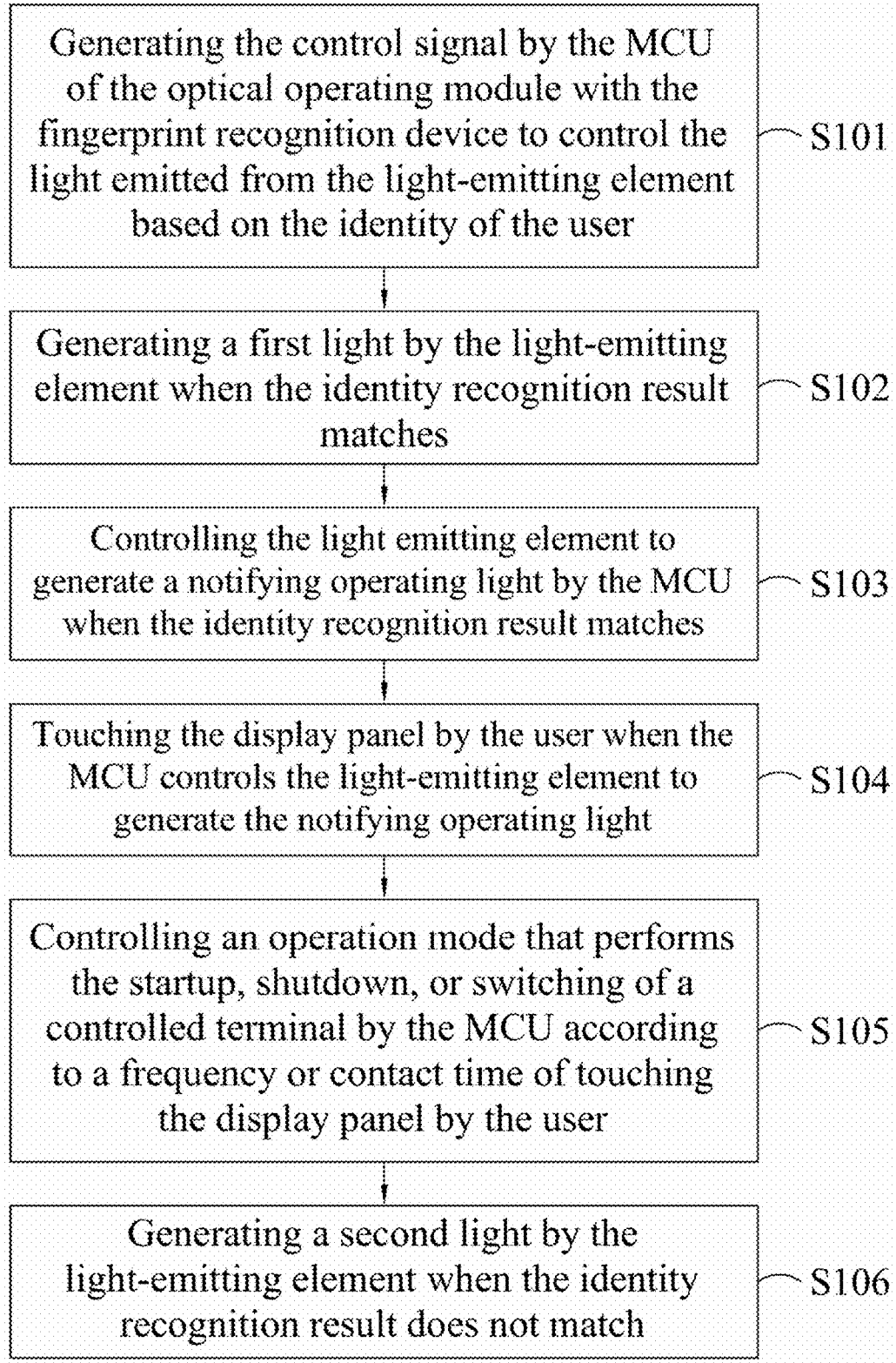
FIG. 14 is a flow chart of the optical operating module with a fingerprint recognition device according to an embodiment in the present invention.

Please refer to FIG. 14 together with FIGS. 1 to 5 and FIGS. 11. to 13. FIG. 14 is the flow chart of the optical operating module with a fingerprint recognition device according to an embodiment in the present invention. The present invention further provides an optical operating method of an optical operating module 100 with a fingerprint recognition device, including following steps:

S101: generating the control signal by the MCU 186 of the optical operating module 100 with the fingerprint recognition device 180 to control the light emitted from the light-emitting element 120 based on the identity of the user;

S102: generating a first light by the light-emitting element 120 when the identity recognition result matches, wherein in an embodiment, a green light is displayed when the recognition matches;

S103: controlling the light-emitting element 120 to generate a notifying operating light by the MCU 186 when the identity recognition result matches;

S104: touching the display panel 160 by the user when the MCU 186 controls the light-emitting element 120 to generate the notifying operating light;

S105: controlling an operation mode that performs the startup, shutdown, or switching of a controlled terminal by the MCU 186 according to a frequency or contact time of touching the display panel 160 by the user.

Specifically, in an embodiment, after recognizing the identity of the user, the mode can be set up as two slight taps by the user to start up the controlled terminal, as one long press to shut down the controlled terminal, and as one slight tap to switch the operation mode of the controlled terminal. Such example can be applied to some settings like switching a function menu of a cell phone.

For example, in an embodiment, when the identity recognition result matches, the operating system is started up. In another instance, when a car or a cell phone receives an order of permission and enters an operation mode, the light color of the display panel 160 can be used to indicate the selected state of the operation mode. As another example, the orange light corresponds to the high temperature mode and the blue light corresponds to the low temperature mode.

S106: generating a second light by the light-emitting element 120 when the identity recognition result does not match, wherein in an embodiment, a red light is displayed when the recognition does not match.

Specifically, when the identity recognition result does not match, the light-emitting element 120 further generates a strong light, such as a red flash light, to prevent malicious operation.

In addition, in an embodiment, the MCU 186 is electrically connected to a sound notifying device. When the identity recognition result does not match, the MCU 186 controls the sound notifying device to generate a notifying sound, such as a warning sound.

In another embodiment, when the controlled terminal receives a message, such as a SMS notification, incoming call notification, power status indication, and operation status indication, the MCU 186 controls the light-emitting element 120 to generate a message notifying light, for instance, emitting a blue light or a green light to notify the user.

In summary, the optical operating module with a fingerprint recognition device and the optical operating method thereof provided by the present invention relate to a function able to notify the user by emitting abundant light under different circumstances, and also relate to integrating functions such as operation and control into a module or a system.

The embodiments stated above are only illustrative examples which do not limit the present invention. Any spirit and scope without departing from the present invention as to equivalent modifications or alterations is intended to be included in the following claims.

What is claimed is:

1. An optical operating module, comprising:
   at least one light-emitting element, comprising:
      at least one light-emitting unit;
      a first light-exit surface; and
      an electrical connector, which conducts and inputs a driving current into the light-emitting unit, wherein the light-emitting unit provides at least a light to the first light-exit surface, and the light is emitted from the first light-exit surface;
   a light guide element, comprising:
      at least one first light-receiving surface forming a gap with the first light-exit surface and receiving the light from the first light-exit surface;
      at least one reflective curved surface receiving and reflecting the light from the first light-receiving surface, wherein a bent angle of the reflective curved surface is in a range from 0 to 180 degrees, and the one reflective curved surface comprises a curved surface formed with one or multiple of a straight line, a circular arc line, and a polynomial fitting curve;
      a first reflective surface receiving and reflecting the light from the reflective curved surface; and
      at least one second light-exit surface disposed opposite to the first reflective surface, forming an angle with the first reflective surface, and receiving the light from the first reflective surface, the light being emitted from the second light-exit surface;
   at least one display panel, a part of which is disposed on the light guide element, and the other part which is not disposed on the light guide element forming an accommodating space with the light guide element, comprising:
      a second light-receiving surface receiving the light from the second light-exit surface; and
      a third light-exit surface receiving the light from the second light-receiving surface, the light being emitted from the third light-exit surface; and
      a control element disposed on the accommodating space, and at least generating a control signal to control the light-emitting element after receiving a command of an action.

2. The optical operating module according to claim 1, wherein the control element is electrically connected to an operation processing device, and the operation processing device receives the control signal to control an operation mode that performs a startup, a shutdown, or a switching of a controlled terminal.

3. The optical operating module according to claim 2, wherein the controlled terminal comprises at least one of a cell phone, notebook, vehicle activating device, vehicle operating system, door open device, and door lock.

4. The optical operating module according to claim 1, wherein an accommodating slot is disposed on a center of a top surface of the light guide element, an outer edge of the top surface is the second light-exit surface, and the display panel is bonded to the second-exit surface by an optical adhesive and forms the accommodating space with the accommodating slot.

5. The optical operating module according to claim 1, wherein the gap between the first light-receiving surface and the first light-exit surface is less than 1.0 mm, and an angle formed between the first light-receiving surface and the first light-exit surface is less than 90 degrees; the first reflective surface is disposed opposite to the second light-exit surface, and the angle formed between the first reflective surface and the second light-exit surface is less than 90 degrees.

6. The optical operating module according to claim 1, wherein the light-emitting element comprises at least one light-emitting diode unit, and the control element controls the light-emitting diode unit to generate visible light having a plurality of colors.

7. The optical operating module according to claim 6, wherein the second light-receiving surface and the third light-exit surface comprise a printed specific pattern, the printed specific pattern comprises a light-transmissive region and a light-impermeable region, and the visible light is emitted from the light-transmissive region.

8. The optical operating module according to claim 1, wherein the light guide element is an optical plastic injection element, and a refractive index of the optical plastic injection element is between 1.4 and 1.7.

9. The optical operating module according to claim 1, wherein the display panel is an optical plastic injection element, an optical glass element, or a sapphire glass element, a refractive index of the optical plastic injection element is between 1.4 and 1.7, and refractive indices of the optical glass element and the sapphire glass element are between 1.4 and 2.0.

10. An optical operating module with a fingerprint recognition device, comprising:
at least one light-emitting element, comprising:
at least one light-emitting unit;
a first light-exit surface; and
an electrical connector, which conducts and inputs a driving current into the light-emitting unit, wherein the light-emitting unit provides at least a light to the first light-exit surface, and the light is emitted from the first light-exit surface;
a light guide element, comprising:
at least one first light-receiving surface forming a gap with the first light-exit surface and receiving the light from the first light-exit surface;
at least one reflective curved surface receiving and reflecting the light from the first light-receiving surface, wherein a bent angle of the reflective curved surface is in a range from 0 to 180 degrees, and the one reflective curved surface comprises a curved surface formed with one or multiple of a straight line, a circular arc line, and a polynomial fitting curve;
a first reflective surface receiving and reflecting the light from the reflective curved surface; and
at least one second light-exit surface disposed opposite to the first reflective surface, forming an angle with the first reflective surface, and receiving the light from the first reflective surface, the light being emitted from the second light-exit surface;
at least one display panel, a part of which is disposed on the light guide element, and the other part which is not disposed on the light guide element forming an accommodating space with the light guide element, comprising:
a second light-receiving surface receiving the light from the second light-exit surface; and
a third light-exit surface receiving the light from the second light-receiving surface, the light being emitted from the third light-exit surface; and
a fingerprint recognition device disposed on the accommodating space and connected to the panel display, comprising:
a substrate;
a fingerprint recognition sensor disposed between the substrate and the third light-exit surface, receiving a fingerprint, and generating a fingerprint recognition signal; and
a micro-control unit (MCU) recognizing an identity of a user after receiving the fingerprint recognition signal, and generating a control signal according to an identity recognition result from the user to control the light emitted from the light-emitting element.

11. The optical operating module with the fingerprint recognition device according to claim 10, wherein the MCU is electrically connected to a controlled terminal, and the MCU controls an operation mode that performs a startup, a shutdown, or a switching of the controlled terminal.

12. The optical operating module with the fingerprint recognition device according to claim 11, wherein the controlled terminal comprises at least one of a cell phone, notebook, vehicle activating device, vehicle operating system, door open device, and door lock.

13. The optical operating module with the fingerprint recognition device according to claim 10, wherein the light-emitting element comprises at least one light-emitting diode unit, and the light-emitting diode unit generates visible light having a plurality of colors according to the control signal.

14. The optical operating module with the fingerprint recognition device according to claim 13, wherein the second light-receiving surface and the third light-exit surface comprise a printed specific pattern, the printed specific pattern comprises a light-transmissive region and a light-impermeable region, and the visible light is emitted from the light-transmissive region.

15. The optical operating module with the fingerprint recognition device according to claim 10, wherein the light guide element is an optical plastic injection element, and a refractive index of the optical plastic injection element is between 1.4 and 1.7.

16. The optical operating module with the fingerprint recognition device according to claim 10, wherein the display panel is an optical plastic injection element, an optical glass element, or a sapphire glass element, a refractive index of the optical plastic injection element is between 1.4 and 1.7, and refractive indices of the optical glass element and the sapphire glass element are between 1.4 and 2.0.

17. The optical operating module with the fingerprint recognition device according to claim 10, wherein a portion of the display panel is bonded to the light guide element by an optical adhesive, a thickness of an optical adhesive layer formed by the optical adhesive is less than 0.02 mm, and a thickness of the display panel is less than or equal to 0.175 mm.

18. The optical operating module with the fingerprint recognition device according to claim 17, wherein an electric field distribution changes when the fingerprint of the user is pressed on the display panel, and the fingerprint recognition sensor generates the fingerprint recognition signal according to the electric field distribution.

19. The optical operating module with the fingerprint recognition device according to claim 10, wherein a fingerprint image is generated on the display panel when the fingerprint of the user is pressed on the display panel, and the fingerprint recognition sensor generates the fingerprint recognition signal according to the fingerprint image.

20. An operating method of an optical operating module with a fingerprint recognition device, comprising:
  generating the control signal by the MCU of the optical operating module with the fingerprint recognition device according to claim 10 to control the light emitted from the light-emitting element based on the identity of the user;
  generating a first light by the light-emitting element when the identity recognition result matches;
  controlling the light-emitting element to generate a notifying operating light by the MCU when the identity recognition result matches;
  touching the display panel by the user when the MCU controls the light-emitting element to generate the notifying operating light;
  controlling an operation mode that performs a startup, a shutdown, or a switching of a controlled terminal by the MCU according to a frequency or contact time of touching the display panel by the user; and
  generating a second light by the light-emitting element when the identity recognition result does not match.

21. The operating method of the optical operating module with the fingerprint recognition device according to claim 20, wherein when the identity recognition result does not match, the light-emitting element further generates a strong flash light.

22. The operating method of the optical operating module with the fingerprint recognition device according to claim 20, wherein the MCU is electrically connected to a sound notifying device.

23. The operating method of the optical operating module with the fingerprint recognition device according to claim 22, wherein when the identity recognition result does not match, the MCU controls the sound notifying device to generate a notifying sound.

24. The operating method of the optical operating module with the fingerprint recognition device according to claim 20, wherein when the controlled terminal receives a message, the MCU controls the light-emitting element to generate a message notifying light.

25. The operating method of the optical operating module with the fingerprint recognition device according to claim 24, wherein the message comprises a SMS notification, an incoming call notification, a power status indication, and an operation status indication.

* * * * *